United States Patent
Fujita et al.

(10) Patent No.: US 8,695,742 B2
(45) Date of Patent: Apr. 15, 2014

(54) VEHICLE

(71) Applicants: Atsuhisa Fujita, Toyota (JP); Kazuyuki Ueno, Yokosuka (JP)

(72) Inventors: Atsuhisa Fujita, Toyota (JP); Kazuyuki Ueno, Yokosuka (JP)

(73) Assignees: Toyota Jidosha Kabushiki Kaisha, Toyota (JP); Toyota Motor East Japan, Inc., Miyagi (JP)

( * ) Notice: Subject to any disclaimer, the term of this patent is extended or adjusted under 35 U.S.C. 154(b) by 0 days.

(21) Appl. No.: 13/690,659

(22) Filed: Nov. 30, 2012

(65) Prior Publication Data

US 2013/0168169 A1    Jul. 4, 2013

(30) Foreign Application Priority Data

Dec. 8, 2011   (JP) ................. 2011-269201

(51) Int. Cl.
*B60K 1/04*      (2006.01)
*B60K 11/06*     (2006.01)

(52) U.S. Cl.
USPC ......... 180/89.1; 180/68.1; 180/68.5; 296/208

(58) Field of Classification Search
CPC .... B60K 1/04; B60K 11/06; B60K 2001/005; B06H 1/00; B06H 1/00278
USPC ....................... 180/89.1, 68.1, 68.5
See application file for complete search history.

(56) References Cited

U.S. PATENT DOCUMENTS

| | | | | |
|---|---|---|---|---|
| 7,654,351 B2* | 2/2010 | Koike et al. | ................. | 180/68.5 |
| 8,187,736 B2* | 5/2012 | Park et al. | ................. | 429/62 |
| 2001/0030069 A1* | 10/2001 | Misu et al. | ................. | 180/68.1 |
| 2003/0095382 A1* | 5/2003 | Takedomi et al. | ................. | 361/688 |
| 2010/0099019 A1* | 4/2010 | Nagata et al. | ................. | 429/120 |
| 2010/0276220 A1* | 11/2010 | Kubota et al. | ................. | 180/68.1 |
| 2010/0294580 A1* | 11/2010 | Kubota et al. | ................. | 180/68.1 |
| 2012/0073694 A1* | 3/2012 | Leffert et al. | ................. | 138/177 |
| 2012/0247848 A1* | 10/2012 | Kosaka et al. | ................. | 180/68.1 |

FOREIGN PATENT DOCUMENTS

| | | |
|---|---|---|
| JP | A 2002-231321 | 8/2002 |
| JP | A 2007-314139 | 12/2007 |
| JP | A 2008-141945 | 6/2008 |
| JP | A 2009-12606 | 1/2009 |

* cited by examiner

*Primary Examiner* — Ruth Ilan
(74) *Attorney, Agent, or Firm* — Oliff PLC

(57) ABSTRACT

A vehicle includes a body outer panel; a battery; a second seat including a seatback; a seatbelt apparatus including a webbing; and a side trim positioned behind the seatback of the second seat in a vehicle front-rear direction. The side trim includes an insertion opening through which the webbing of the seatbelt apparatus is inserted, an exhaust opening through which exhaust air after cooling the battery is discharged into a space between the side trim and the body outer panel, and an inlet opening which is positioned behind the insertion opening in the vehicle front-rear direction, and through which the exhaust air in the space is drawn into a vehicle room.

4 Claims, 6 Drawing Sheets

VEHICLE

INCORPORATION BY REFERENCE

The disclosure of Japanese Patent Application No. 2011-269201 filed on Dec. 8, 2011 including the specification, drawings and abstract is incorporated herein by reference in its entirety.

BACKGROUND OF THE INVENTION

1. Field of the Invention

The present invention relates to a method of discharging air that has been used for cooling a battery installed in a vehicle.

2. Description of Related Art

In electric vehicles or hybrid vehicles, a battery such as a lithium-ion battery or a nickel hydride battery is installed for driving an electric motor. The battery degrades when the temperature of the battery increases. In such a kind of vehicle, air is delivered to the battery to cool the battery. In a case where all the air which has cooled the battery is discharged outside the vehicle, introduction of outside air is required. However, since outside air is at a higher temperature than the room temperature, for example, in summer, the efficiency of cooling a vehicle room by air-conditioning decreases, resulting in impaired fuel efficiency.

Accordingly, a vehicle is known in which for an improvement in the fuel efficiency, relatively low-temperature air in a vehicle room is delivered to a battery, the air which has cooled the battery is discharged into a narrow space between a body outer panel and a side trim that is an interior material of the vehicle which is provided on a side surface of a cargo compartment and the discharged air is returned to the vehicle room (for example, refer to Japanese Patent Application Publication No. 2002-231321 (JP 2002-231321 A)).

An insertion opening through which a webbing of a seatbelt apparatus is inserted is formed in the side trim at a position near a seatback of a second seat. Further, in JP 2002-231321 A, the air in the vehicle room is drawn in and delivered to the battery, thus providing negative pressure in the vehicle room. Therefore, in JP 2002-231321 A, the air discharged into the narrow space between the body outer panel and the side trim blows out from the insertion opening and returns into the vehicle room because of the negative pressure in the vehicle room. Accordingly, in JP 2002-231321 A, the air blowing out from the insertion opening contacts a passenger on a rear seat, and the passenger may thereby feel uncomfortable.

SUMMARY OF THE INVENTION

The present invention provides a vehicle in which air that has cooled a battery is prevented from blowing out from an insertion opening through which a webbing of a seatbelt apparatus is inserted.

An aspect of the invention relates to a vehicle. The vehicle includes a body outer panel; a battery; a second seat including a seatback; a seatbelt apparatus including a webbing; and a side trim positioned behind the seatback of the second seat in a vehicle front-rear direction. The side trim includes an insertion opening through which the webbing of the seatbelt apparatus is inserted, an exhaust opening through which exhaust air after cooling the battery is discharged into a space between the side trim and the body outer panel, and an inlet opening which is positioned behind the insertion opening in the vehicle front-rear direction, and through which the exhaust air in the space is drawn into a vehicle room.

According to the aspect of the present invention, the exhaust air is discharged from the battery-side into the space between the side trim and the body outer panel. However, since the exhaust air discharged into the space is drawn into the vehicle room through the inlet opening, it is possible to reduce the exhaust air that blows out from the space through the insertion opening, thereby preventing a passenger on the second seat from feeling uncomfortable due to the blowing-out air.

According to the aspect of the present invention, since the exhaust air discharged into the space between the side trim and the body outer panel can be smoothly drawn into the vehicle room through the inlet opening, it is possible to reduce the flow speed of the exhaust air blowing out from the insertion opening, as compared to related art in which the exhaust air in the space blows out toward the vehicle room only from the insertion opening. Therefore, according to the aspect of the present invention, it is possible to reduce pressure loss due to the exhaust air blowing out from the insertion opening, thereby improving the cooling efficiency.

In the above-described aspect, the exhaust opening may be positioned below the insertion opening, and the inlet opening may be positioned above the exhaust opening and positioned at a same height as the insertion opening or below the insertion opening.

In the above-described aspect, the side trim may further include an air guiding rib that protrudes toward the body outer panel, and extends from a lower portion of a front side of the side trim in the vehicle front-rear direction toward an upper portion of a rear side of the side trim in the vehicle front-rear direction; and the air guiding rib may include a wall portion that guides the exhaust air, which has been discharged through the exhaust opening, toward the inlet opening.

In the above-described aspect, an area of the inlet opening may be larger than an area of the insertion opening.

According to the aspect of the present invention, the air that has cooled the battery can be prevented from blowing out from the insertion opening for the webbing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the present invention will be described hereinafter with reference to the drawings.

Figure 1:
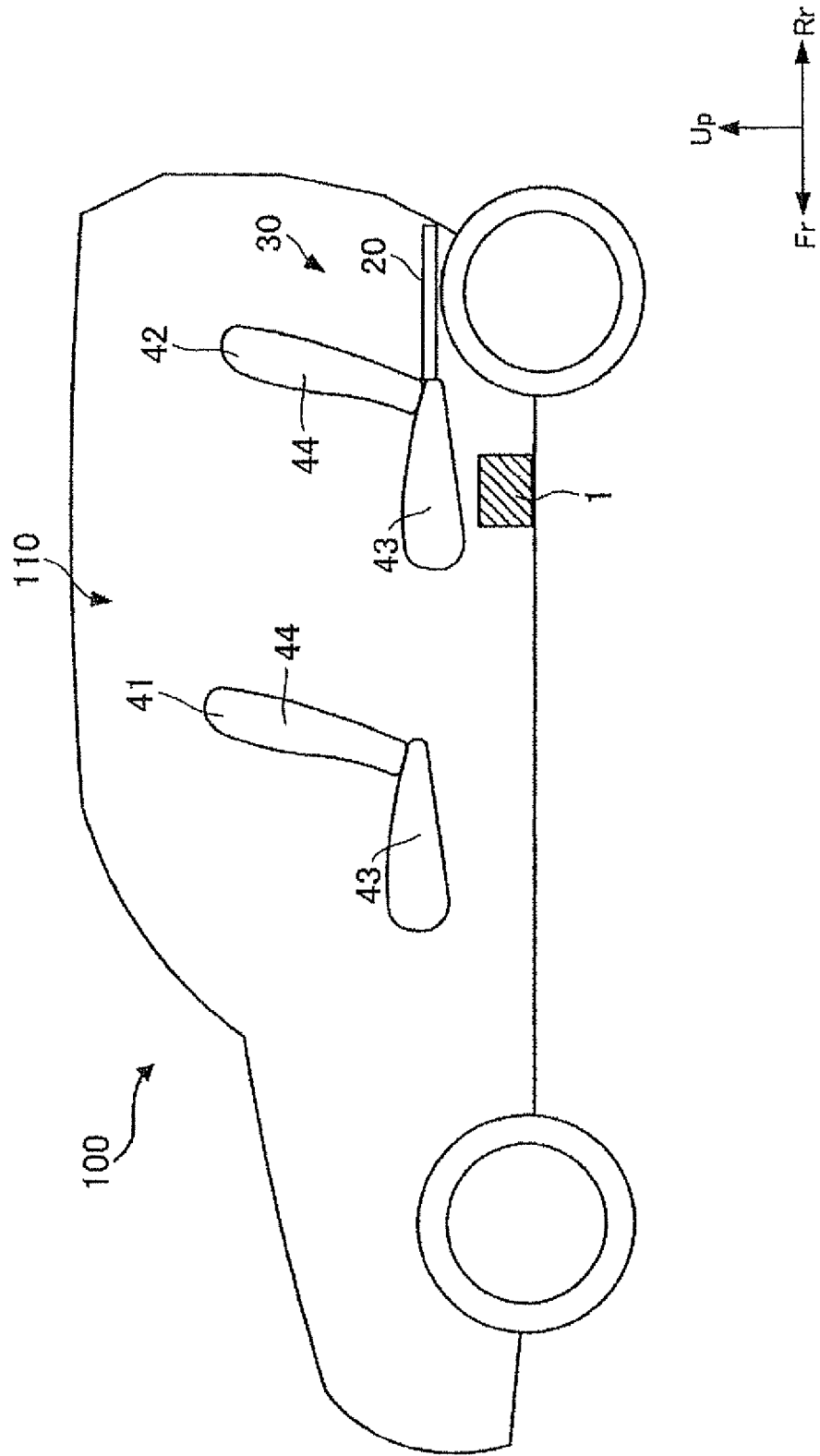
FIG. 1 is a schematic diagram of a vehicle in accordance with an embodiment of the present invention.

FIG. 1 is a schematic diagram of a vehicle 100. In FIG. 1, an arrow Fr indicates the front side of the vehicle 100, an arrow Rr indicates the rear side of the vehicle 100, and an arrow Up indicates the upper side of the vehicle 100.

The vehicle 100 is a hybrid vehicle including a drive path for driving a motor using electric power of a battery 1 and a drive path configured with an internal combustion engine. The vehicle 100 may be a plug-in hybrid vehicle in which the battery 1 is rechargeable by a commercial power supply provided outside. The vehicle 100 may be an electric vehicle having only the drive path for driving a motor using electric power of the battery 1.

The vehicle 100 includes, in a vehicle room 110, front seats 41 that are a driver seat and a passenger seat, and a second seat 42 which is disposed in the rear side of the vehicle, and on which two or three passengers can sit. Each of the seats 41 and 42 has a cushion seat 43 and a seatback 44 which is pivotable in the front-rear direction about its lower end. A cargo compartment 30 is formed behind the second seat 42. That is, the cargo compartment 30 is formed in the vehicle room 110.

Figure 2:
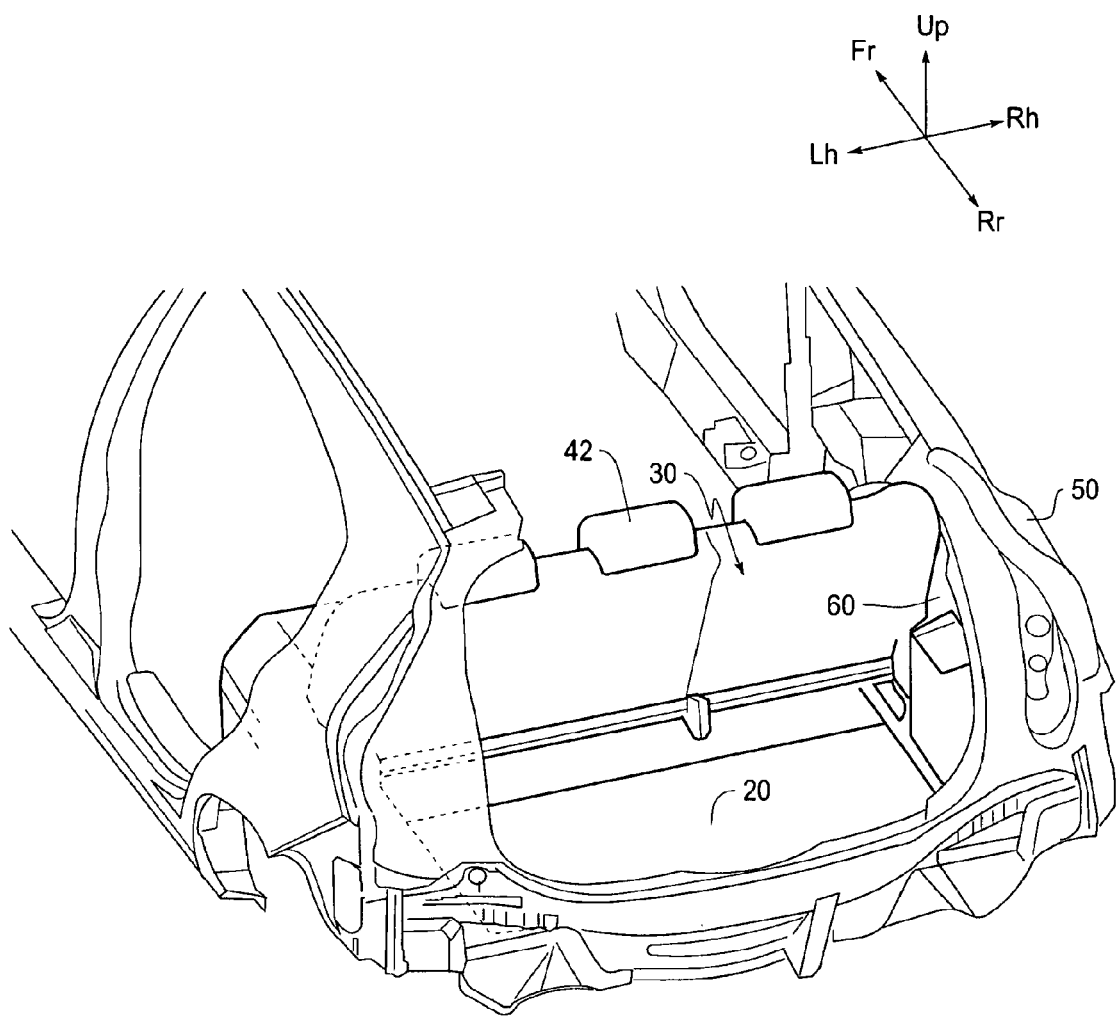
FIG. 2 is a perspective view illustrating a cargo compartment in the embodiment.

FIG. 2 is a perspective view illustrating the cargo compartment 30. In FIG. 2, an arrow Rh indicates the right side with respect to the traveling direction Fr of the vehicle 100, and an arrow Lh indicates the left side. If it is not necessary to particularly distinguish between the left side and the right side, the left-right direction will be referred to as the vehicle width direction.

The cargo compartment 30 is constituted by a space surrounded by the second seat 42, left and right side trims 60 (only the side trim 60 in the right side is shown in FIG. 2) provided inside the body outer panel 50, and a deck board 20.

Figure 3:
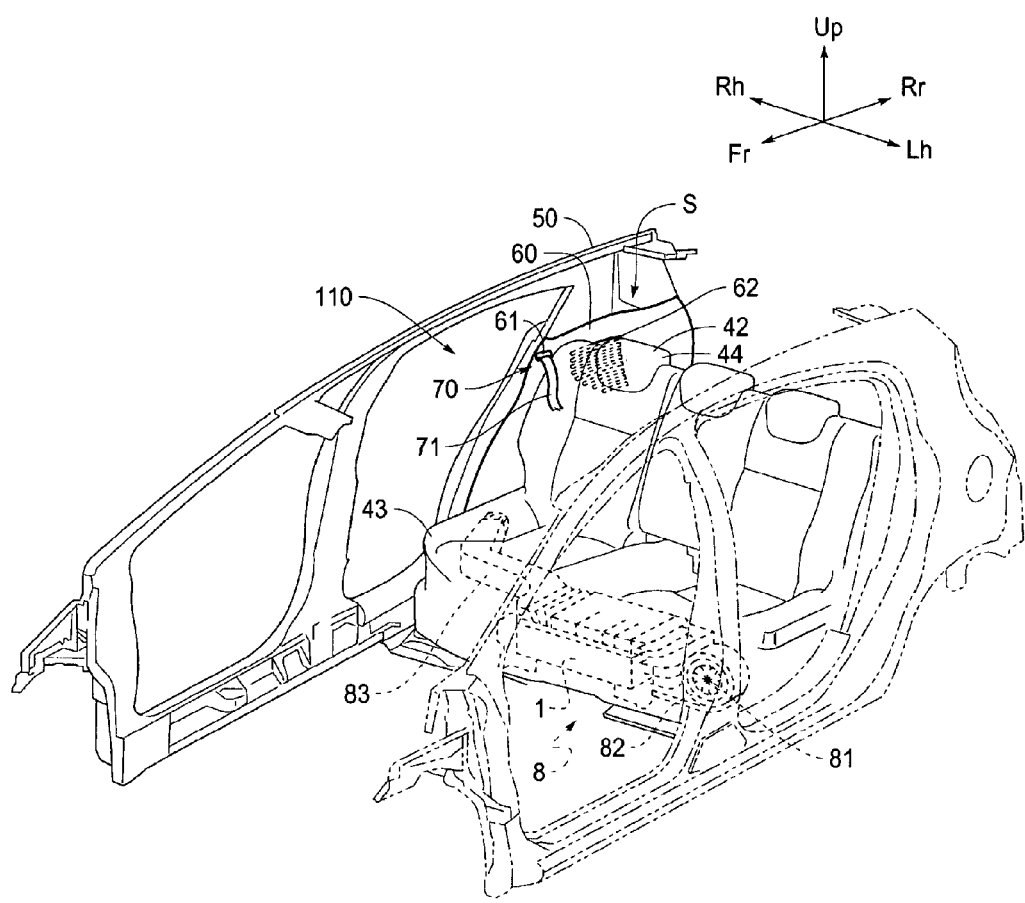
FIG. 3 is a perspective view illustrating a vehicle room in the embodiment.

FIG. 3 is a perspective view illustrating the vehicle room 110.

An insertion opening 61 through which a belt-shaped webbing 71 of a seatbelt apparatus 70 is inserted is formed in the side trim 60 at a position near the seatback 44 of the second seat 42. Further, an inlet opening 62 described later is formed only in the side trim 60 on the vehicle right side shown in FIG. 3. A narrow space S (space) is formed between the side trim 60 and the body outer panel 50.

A retractor for winding up an end side of the webbing 71 is housed in the narrow space S. The other end side of the webbing 71 is fixed to an anchor provided in the lower side of the vehicle room 110. The webbing 71 is constantly urged in a winding direction which is the upward direction in FIG. 2 by the retractor. A required length of the webbing 71 can be pulled out downward from the insertion opening 61 by pulling the webbing 71 downward.

The battery 1 and a cooling system 8 for the battery 1 are provided below the cushion seat 43 of the second seat 42. The battery 1 has a long shape and is disposed in a manner such that the longitudinal direction of the battery 1 extends in parallel with the width direction of the vehicle 100. The cooling system 8 includes a blower 81 that draws air into the vehicle room 110, an air flow duct 82 through which the air discharged by the blower 81 is delivered to the battery 1, and a discharge duct 83 through which the air that has cooled the battery 1 is discharged to the narrow space S.

Figure 4:
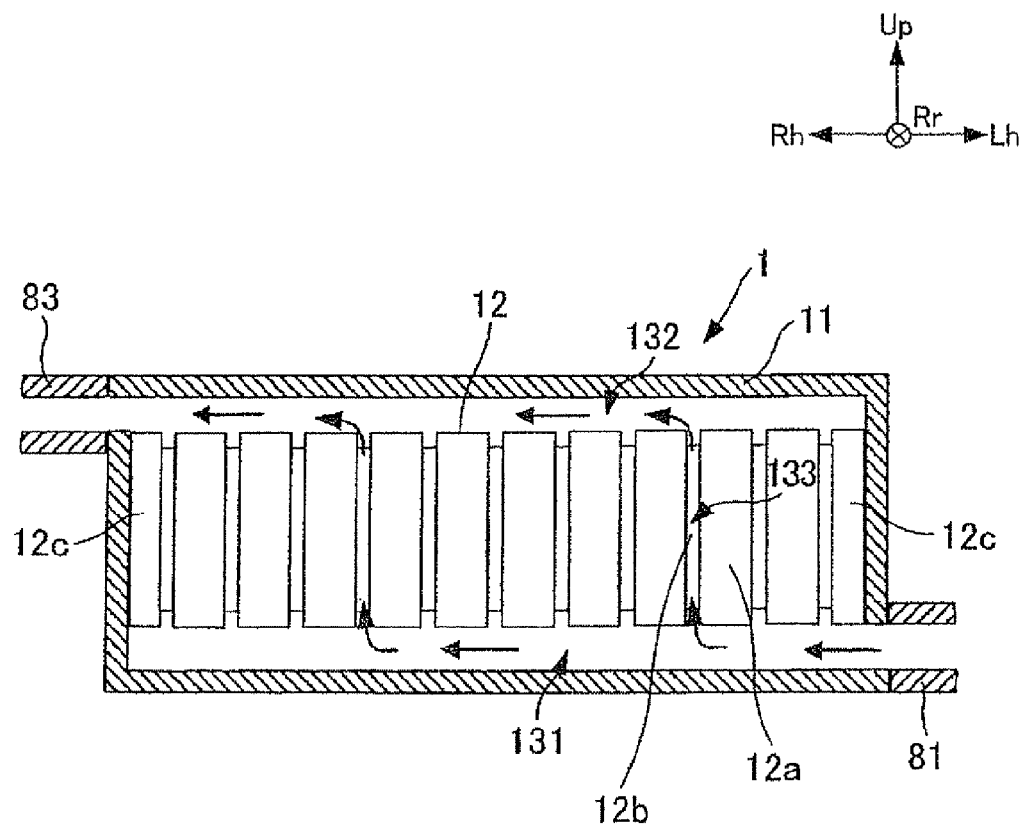
FIG. 4 is a sectional view of a battery in the embodiment.

FIG. 4 is a sectional view of the battery 1. The battery 1 includes a pack casing 11 formed of metal, and an assembled battery 12 housed inside the pack casing 11. A lower cooling air passage 131 connected to the air flow duct 82 is formed between the lower side of the assembled battery 12 and the pack casing 11. An upper cooling air passage 132 connected to the discharge duct 83 is formed between the upper side of the assembled battery 12 and the pack casing 11.

The assembled battery 12 includes a plurality of unit cells 12a that are linearly aligned, spacers 12b each of which is positioned between the adjacent unit cells 12a, end plates 12c disposed such that the unit cells 12a and the spacers 12b are interposed between the end plates 12c. Each spacer 12b contacts outer surfaces of the unit cells 12a, and thus, each of coupling cooling air passages 133 for coupling the cooling air passages 131 and 132 together is formed between the adjacent unit cells 12a. The unit cell 12a may be a secondary cell such as a lithium-ion cell or a nickel hydride cell, or a capacitor. Further, the unit cell 12a may be a so-called prismatic battery or a cylindrical cell.

When the blower 81 is actuated, the air in the vehicle room 110 is delivered through the air flow duct 82 to the lower cooling air passage 131. The air flows through the cooling air passages 131 to 133, cools the assembled battery 12, and is thereafter delivered to the discharge duct 83.

Figure 5:
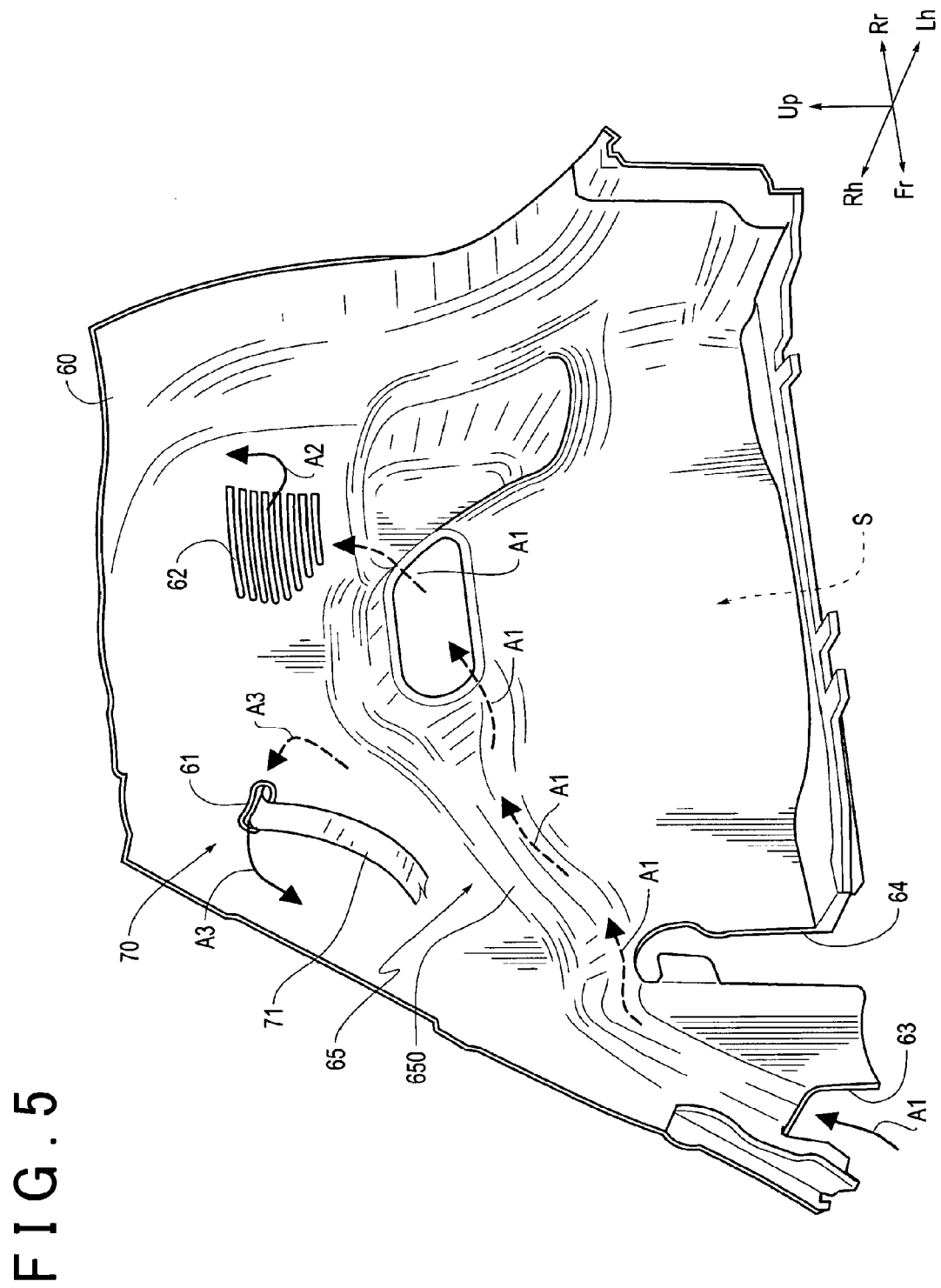
FIG. 5 is a perspective view of a side trim in the right side of the vehicle in the embodiment.

FIG. 5 is a perspective view of the side trim 60 positioned in the right side of the vehicle 100. An exhaust opening 63 connected to the discharge duct 83 is formed in a lower portion of a front side of the side trim 60 in the vehicle front-rear direction. In the side trim 60, an opening 64 for a fixture of a child seat compatible with ISO-FIX is formed behind the exhaust opening 63 in the vehicle front-rear direction. The insertion opening 61 through which the webbing 71 is inserted is formed in an upper portion of the front side of the side trim 60 in the vehicle front-rear direction, the upper portion being positioned near the seatback 44 of the second seat 42. An inlet opening 62 constituted by a plurality of long holes is located behind the insertion opening 61 in the vehicle front-rear direction and below the insertion opening 61. The opening area of the inlet opening 62 is larger than the opening area of the insertion opening 61.

Further, an air guiding rib 65 is formed in a central portion in the up-down direction, in the front side of the side trim 60 in the vehicle front-rear direction. The air guiding rib 65 has an inclined surface that connects a lower surface of the side trim 60 which is located on the foreground side (at a less deep position) in the sheet of FIG. 5 (i.e., on the side away from the body outer panel 50), with an upper surface of the side trim 60 which is located on the background side (at a deeper position) in the sheet of FIG. 5 (i.e., on the side nearer to the body outer panel 50). The air guiding rib 65 extends from the lower portion of the front side of the side trim 60 in the vehicle front-rear direction toward the upper portion of the rear side of the side trim 60 in the vehicle front-rear direction.

The narrow space S (space) for housing the retractor or the like for winding up the webbing 71 is formed between the side trim 60 and the body outer panel 50 which is located at a deeper position than the side trim 60 in the sheet of the FIG. 5. The exhaust opening 63 exhausts, into the narrow space 5, exhaust air A1 that is the air that has cooled the battery 1 and is discharged from the battery 1-side via the discharge duct 83.

The exhaust air A1 discharged into the narrow space S is guided toward the vehicle rear upper side by a wall portion 650 of the air guiding rib 65, and flows to the vicinity of the inlet opening 62. The vehicle room 110 has negative pressure because air is drawn into the cooling system 8. Exhaust air A2, which has flowed to the vicinity of the inlet opening 62, is drawn into the cargo compartment 30 through the inlet opening 62 due to the negative pressure. Further, partial exhaust air A3, which has flowed from the exhaust opening 63, passed the air guiding rib 65, and flowed to the upper side, is drawn into the vehicle room 110 through the insertion opening 61 due to the negative pressure.

In this embodiment, the exhaust air in the narrow space S is drawn into the cargo compartment 30 through the inlet opening 62. This reduces the air blowing out from the insertion opening 61 and thus prevents the passenger on the second seat 42 from feeling uncomfortable due to the air blowing out.

In this embodiment, the exhaust air in the narrow space S is smoothly drawn into the vehicle room 110 through the inlet opening 62 having a larger area than that of the insertion opening 61. Accordingly, as compared to related art in which the exhaust air blows out only through the narrow insertion opening 61, it is possible to reduce the pressure loss due to the discharge of the exhaust air to the vehicle room 110, thereby improving the efficiency of cooling the battery 1.

In this embodiment, since the air in the vehicle room 110 is used for cooling the battery 1, it is possible to cool the battery 1 using relatively low-temperature air even in summer, thereby providing high efficiency of cooling the battery 1.

In this embodiment, since no outside air is drawn in, an odor outside the vehicle does not enter the vehicle room 110, thus preventing the passengers from feeling uncomfortable.

In this embodiment, since the inlet opening 62 is positioned behind the insertion opening 61 in the vehicle front-rear direction, the exhaust air can be drawn into the cargo compartment 30 through the inlet opening 62, and thus, the exhaust air discharged through the inlet opening 62 does not contact the passenger.

In this embodiment, since the inlet opening 62 is positioned above the exhaust opening 63, the exhaust air, which is discharged through the exhaust opening 63 and flows upward, can be smoothly drawn into the cargo compartment 30 through the inlet opening 62. Further, in this embodiment, since the inlet opening 62 is positioned below the insertion opening 61, as compared to a case where the inlet opening 62 is positioned above the insertion opening 61, the exhaust air flowing upward from the lower side can be properly drawn into the cargo compartment 30 through the inlet opening 62, thereby reducing the amount of the exhaust air that blows out through the insertion opening 61.

In this embodiment, in the side trim 60, the air guiding rib 65 protruding toward the body outer panel 50 is provided. The air guiding rib 65 is positioned between the exhaust opening 63 and the insertion opening 61 (i.e., the air guiding rib 65 is positioned so as to avoid the insertion opening 61). The air guiding rib 65 inclines, that is, extends from the lower portion of the front side of the side trim 60 in the vehicle front-rear direction toward the upper portion of the rear side of the side trim 60 in the vehicle front-rear direction. Therefore, in this embodiment, the exhaust air discharged through the exhaust opening 63 into the narrow space S is properly guided toward the inlet opening 62 by the wall portion 650 of the air guiding rib 65, thereby providing high efficiency of drawing the exhaust air from the narrow space S toward the cargo compartment 30.

Example

Figure 6:
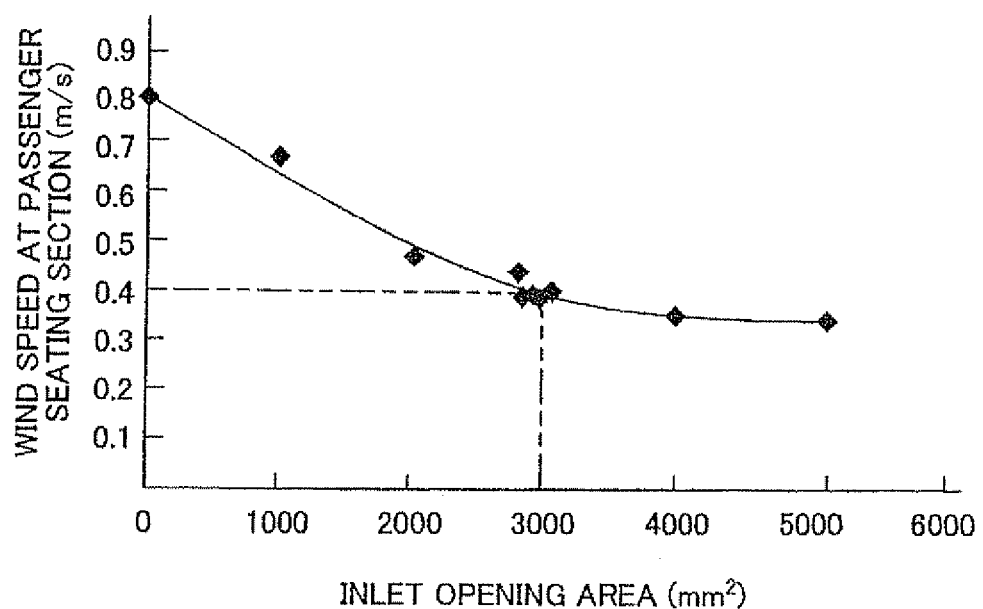
FIG. 6 is a graph showing results of measurement of the flow speed of blowing-out air when an area of an inlet opening is varied.

In the vehicle 100 of the present invention, the flow speed of the air (exhaust air) delivered to the battery 1 by the cooling system 8 was set to 100 mm³/h, and the area of the inlet opening 62 was varied between 0 and 5,000 mm², and the flow speed of the air blowing out from the insertion opening 61 was measured at a passenger seating section (a position in front of the seatback 44 of the second seat 42). FIG. 6 shows the measurement results.

As shown in FIG. 6, in a case where the inlet opening 62 was not formed (i.e., the case where the area of the inlet opening is zero mm²), the wind speed of the blowing-out air at the passenger seating section was 0.8 m/s. However, it was observed that when the inlet opening 62 having an area of 3,000 mm² was formed, the wind speed of the blowing-out air at the passenger seating section was changed to 0.4 m/s. In other words, it was confirmed that the wind speed of the blowing-out air at the passenger seating section is sufficiently reduced, and the uncomfortable feeling of the passenger due to the blowing-out air is reduced by forming the inlet opening 62. It was found that when the wind speed of the blowing-out air at the passenger seating section is 0.4 m/s or lower, the passenger does not feel uncomfortable due to the blowing-out air. Accordingly, the area of the inlet opening is preferably set to 3,000 mm² or larger so that the wind speed of the blowing-out air at the passenger seating section is 0.4 m/s or lower.

In the above embodiment, the whole amount of air that has cooled the battery 1 is drawn from the narrow space S toward the vehicle room 110. However, a quarter vent duct may be provided in the narrow space S, and when the pressure in the narrow space S increases, part of the air in the narrow space S may be discharged outside the vehicle by the quarter vent duct.

The exhaust opening may be positioned above the insertion opening 61 and may be in any position with respect to the insertion opening 61. The inlet opening may be positioned at the same height as the insertion opening 61, may be positioned above the insertion opening 61, and may be in any position with respect to the insertion opening 61. The opening area of the inlet opening may be smaller than the opening area of the insertion opening. The exhaust opening and the inlet opening may be positioned in the side trim 60 in the left side of the vehicle.

What is claimed is:

1. A vehicle comprising:
   a body outer panel;
   a battery;
   a second seat including a seatback;
   a seatbelt apparatus including a webbing; and
   a side trim positioned behind the seatback of the second seat in a vehicle front-rear direction, the side trim including an insertion opening through which the webbing of the seatbelt apparatus is inserted, an exhaust opening through which exhaust air after cooling the battery is discharged into a space between the side trim and the body outer panel, and an inlet opening which is positioned behind the insertion opening in the vehicle front-rear direction, and through which the exhaust air in the space is drawn into a vehicle room.

2. The vehicle according to claim 1, wherein the exhaust opening is positioned below the insertion opening, and the inlet opening is positioned above the exhaust opening and positioned at a same height as the insertion opening or below the insertion opening.

3. The vehicle according to claim 2, wherein:
   the side trim further includes an air guiding rib that protrudes toward the body outer panel, and extends from a lower portion of a front side of the side trim in the vehicle front-rear direction toward an upper portion of a rear side of the side trim in the vehicle front-rear direction; and
   the air guiding rib includes a wall portion that guides the exhaust air, which has been discharged through the exhaust opening, toward the inlet opening.

4. The vehicle according to claim 1, wherein an area of the inlet opening is larger than an area of the insertion opening.

* * * * *